Nov. 12, 1935.  S. BALLANTINE  2,020,347
ELECTRIC WAVE ALTIMETER
Filed Dec. 15, 1928  2 Sheets-Sheet 1

Effect of Operating Frequency upon Sensitivity of Electric Wave Altimeter $\nu/\nu_0$ = Operating Frequency / Natural Frequency Inventor:
Stuart Ballantine,
By Byrnes, Townsend & Brickenstein,
Attorneys.

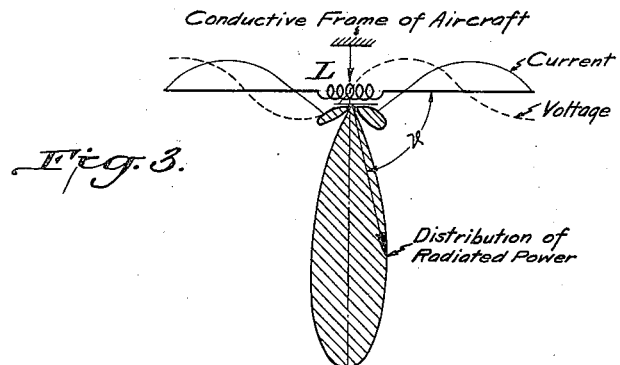
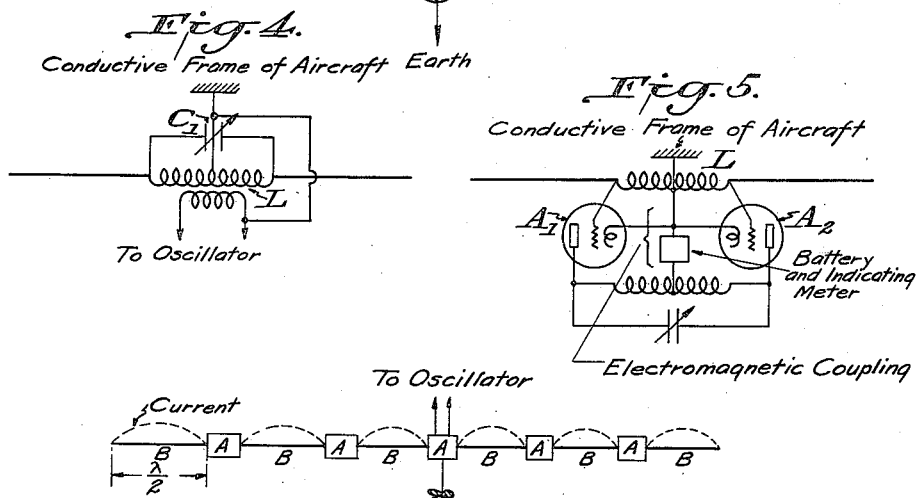
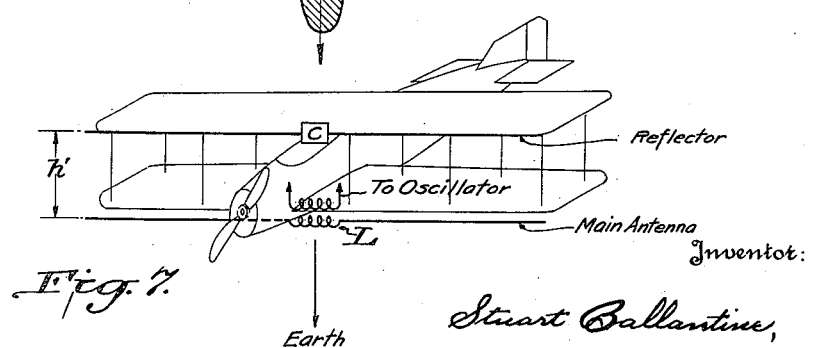

Patented Nov. 12, 1935

2,020,347

UNITED STATES PATENT OFFICE 2,020,347

ELECTRIC WAVE ALTIMETER

Stuart Ballantine, Mountain Lakes, N. J., assignor, by mesne assignments, to Radio Corporation of America, New York, N. Y., a corporation of Delaware Application December 15, 1928, Serial No. 326,394

12 Claims. (Cl. 250—1)

This invention relates to the art of measuring or determining distances by means of electric waves, and more particularly to improvements in electric wave altimeters suitable for use in the flying and navigation of airplanes or other aircraft and to an improved method of operating such altimeters. The present invention is, in part, in the nature of an improvement on the invention described and claimed in the copending application of Frederick H. Drake, Serial No. 247,190, filed January 16, 1928.

One such method of determining distances by means of electric waves consists in radiating electric waves from an antenna located on an airplane so that the radiated waves are reflected from the earth's surface back to the airplane, where they are received on the same antenna and where a characteristic of the received reflected waves, for example their amplitude and phase in relation to the transmitted waves, is used to determine the distance between the antenna and the earth's surface. Conversely, electric waves may be transmitted from the earth and reflected from an aircraft in such a way as to indicate the distance between the transmitter and the reflecting surface.

An object of the present invention is to increase the sensitivity of arrangements of which the foregoing are examples. A further object of the present invention is to employ, in connection with such an altimeter, a particular frequency for the transmitted electric waves which frequency bears such a relation to the other parts and elements of the system as to produce an increased sensitivity thereof. A further object of the invention is to provide suitable means for exciting an antenna forming a part of such a system. Another object of the invention is to provide means for producing directional radiation of electric wave energy from the antenna of such a system. Other objects of the invention are to provide certain specific structural improvements useful in connection with electric wave altimeters. Other objects of the invention will appear from the following description.

Figure 1:
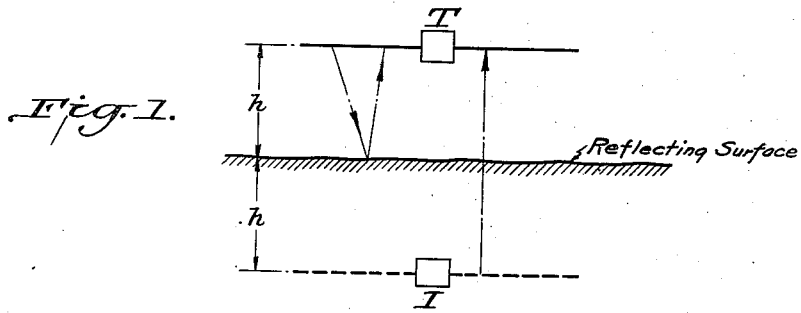
Figure 2:
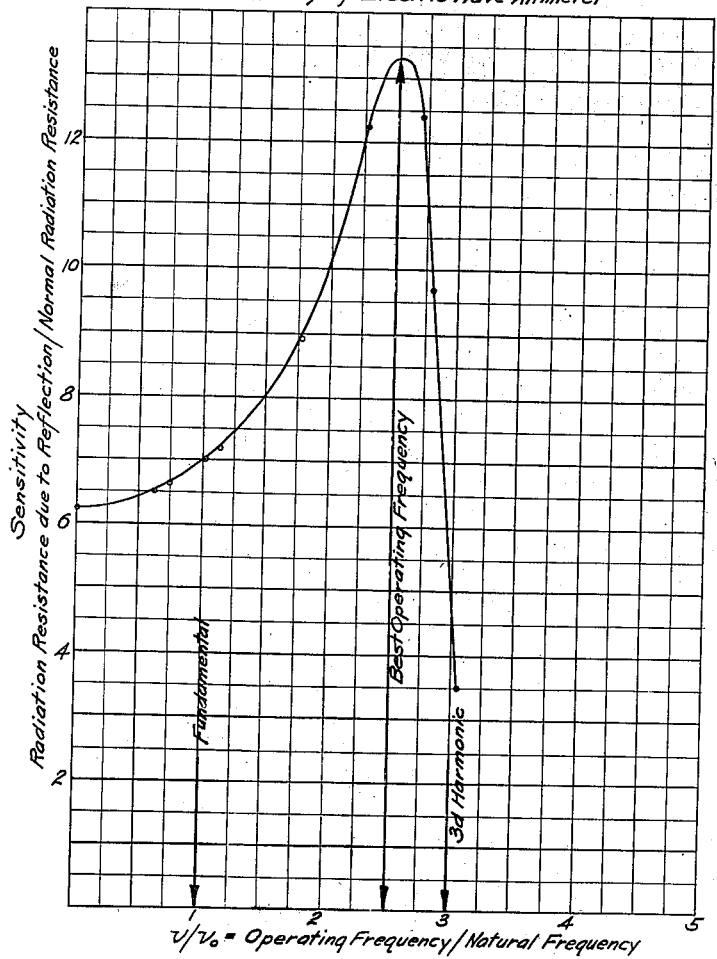

The invention will now be more particularly described in connection with the accompanying drawings, in which Figure 1 is a diagram which will be used in explaining the invention, Figure 2 is a curve illustrating its effects, and Figures 3, 4, 5, 6 and 7 illustrate more specific features of the invention.

Referring now to Figure 1, T represents a horizontal antenna located on an aircraft. An electric wave radiated from it is reflected by the earth's surface and the reflected wave returns to the antenna. The action of the returning wave can be shown to be the same as if the original wave were transmitted from the image antenna, I, located at twice the distance, $h$, between the antenna T and the reflecting surface, care being taken to see that the phase of the wave radiated from the image antenna is adjusted to correspond to the change of phase which takes place upon reflection from the reflecting surface. It can therefore be seen that the problem of increasing the sensitivity of such an altimeter may be treated as the problem of producing the greatest intensity in the antenna T by radiation from an identical antenna I located at a distance $2h$. By the Sommerfeld reciprocity theorem it follows that this problem is the same as the problem of producing maximum reception at I from a given power radiation at T. Thus, anything which can be done to improve the transmission will improve two-fold the sensitivity of the altimeter, and the result, so far as the altimeter is concerned, will be proportional to the square of the improvement in the transmission from I to T or from T to I.

The horizontal antenna T in free space will have a certain radiation resistance. The effect of the earth will be to vary this radiation resistance periodically as the height is changed. The phase of the returning wave, being governed by the height, will rotate continuously with relation to that of the current in the oscillator and will therefore not only result in a change in radiation resistance but also contribute a change in the reactance. Let it be supposed, however, that the altimeter is adjusted to indicate changes in resistance (the reasoning applies equally well to a reactively-sensitive system), then the sensitivity may be taken as proportional to the ratio of the component of the radiation resistance which is due to the reflected wave to the total circuit resistance. In an efficient circuit the radiation resistance will contribute a major portion of the total circuit resistance, and the ratio to be considered is approximately equal to the variable part of the radiation resistance divided by the radiation resistance in free space. Since the improvement in sensitivity will be of interest chiefly at high altitudes, I will consider the value of $h$ to be fixed, and to be large compared with the length of the antenna.

I have performed the calculation of the radiation resistance of the antenna in free space for excitation at various frequencies. (Proc. Inst.

Radio Engs. 12, p. 823, 1924). The variable component due to the reflection from the earth may be found as follows: The total power in the antenna is:

$$\int_0^a E_x I_x \, dx \tag{1}$$

or the integral over the length of the antenna of the product of the tangential electric force $E_x$ and current amplitude $I_x$ at each point. $E_x$ comprises two terms: 1 a part due to the effect of the current in the antenna T, and 2 a part due to reflection from the earth or due to an equivalent current distribution in an image antenna. I have already determined the results of the integration of 1 and will therefore here consider only 2. The current distribution in the antenna is given approximately by:

$$I_x = I \sin \frac{2\pi(l-x)}{\lambda}, \tag{2}$$

where $l$ is the length of one-half of the antenna, $x$ the distance from the center, and $I$ the current at the current loop. The electric force at T due to such a current in the image I will be:

$$E_x = C_1 I \int_0^l \sin \frac{2\pi(l-x)}{\lambda} \cdot dx = I C_2 \sin^2 \frac{(\pi \nu)}{4\nu_0} \tag{3}$$

where $C_1$ and $C_2$ are constants, $\nu$ is the operating frequency and $\nu_0$ is the natural frequency of the unloaded antenna. This E being uniform along the antenna T, the integral 1 becomes $$I^2 R_r = C_3 I^2 \sin^2 \frac{(\pi \nu)}{4\nu_0} \int_0^l \sin \frac{2\pi(l-x)}{\lambda} \cdot dx =$$

$$C_4 I^2 \sin^4 \left(\frac{\pi \nu}{4\nu_0}\right) \tag{4}$$

Hence the sensitivity of the altimeter at a given distance will be:

$$\text{Sensitivity} \propto \frac{\sin^4 \left(\frac{\pi \nu}{4\nu_0}\right)}{R(\text{loop})}, \tag{5}$$

where R (loop) is the radiation resistance in free space referred to the current loop.

The results of calculations from Equation 5 are shown in Fig. 2, in which the sensitivity, as measured by the ratio of the radiation resistance due to reflection divided by the normal radiation resistance, is plotted as ordinate against the ratio of the operating frequency to the natural frequency of the antenna plotted as abscissae. Thus I find that by operating the antenna at a frequency between twice and three times its natural frequency the sensitivity is greatly increased, and that at an operating frequency of the order of 2.5 times the natural frequency of the antenna the sensitivity is approximately a maximum. It will be seen from this curve that the sensitivity at an operating frequency of 2.5 times the fundamental is approximately double the sensitivity at the fundamental, while for frequencies exceeding the optimum value the sensitivity falls off rapidly.

Figure 3 illustrates the current distribution along, and the energy distribution around, the antenna when the excitation frequency is of approximately this optimum value. The power radiation from the antenna is represented by a polar curve of the Poynting vector (E X H) at various angles with respect to the axis of the antenna. The large concentration of energy towards the equational plane, that is, towards the earth when the aircraft is on a level keel, appears clearly from this curve. The sensitivity of the device is increased accordingly.

If the frequency 2.5 times the fundamental is too high for the physical dimension of the antenna the same current distribution as shown in Figure 3 may be preserved by inserting inductive loading coils at the current loops, i. e. intermediate the current nodal points in the radiating portion of the antenna in Figure 3.

Figure 3 also illustrates one suitable mode of exciting the antenna. Since the normal radiation resistance of the antenna is of the order of 100 ohms, the oscillator should be properly coupled to the antenna in order to adapt this high resistance to the oscillating circuit.

In some cases it is desirable or convenient to establish the potential of surrounding conducting objects with respect to the antenna. If these conducting objects are symmetrically arranged they may be connected to the mid-point of the coil L shown in Figure 3 in order to accomplish this result; if the objects are asymmetrically arranged with respect to the antenna, the tap on the coil L is accordingly displaced to one side or the other.

When a direct connection between the oscillator and the antenna is employed, and especially when the oscillator is supplied with current from a battery or generator which is also used for other purposes, such as landing lights and so forth, it is often desirable to connect the filament or cathode terminal of the oscillator to the center of the coil L and to produce the requisite adjustment of the electrical symmetry of the system by means of the condenser $C_1$ as indicated in Figure 4. $C_1$ may suitably be a double condenser having its middle plate grounded to the frame.

Figure 5 illustrates an alternative method of accomplishing the same result by the use of a symmetrical oscillator employing two tubes $A_1$ and $A_2$ connected to the coil L.

Other methods of concentrating the radiation of energy from the antenna in the direction of the earth may also be employed, within the scope of the present invention, to increase the sensitivity of an altimeter system such as has been described. Thus in Figure 6, I have shown a type of radiator which is well adapted to this purpose. The energy distribution of the radiation from such a radiator is also shown in Figure 6. In this case the antenna comprises a series of ½ wave-elements B having the same sign and constituting the radiating sections. Sections A, which may be either coils or coils and condensers in parallel, are non-radiating elements in which the currents are of opposite sign. These non-radiating elements replace electrically lengths of antenna wire equal to those in the radiating sections B. As indicated in the energy distribution diagram the directivity of such a radiating system is excellent.

In certain cases the sensitivity can be still further improved, with either a plane antenna such as that of Figure 1 or a radiating system such as that of Figure 6, by employing a reflecting antenna in association with the main radiating antenna. Such an arrangement is particularly suitable for use on a biplane, in which case the reflector may be supported by the superior wings and the main radiator by the inferior wings. Such an arrangement is illustrated as applied to a simple antenna in Figure 7. In this arrangement C represents an impedance which is used for the adjustment of phase in the reflector. For a given separation $h$ between the two antennas there is an optimum value of the phase in the reflector with reference to the phase of the main antenna. An alternative mode of adjusting the phase is by coupling the altimeter oscillator directly to the reflector. Still another suitable arrangement is directly to excite the superior antenna by means of the altimeter oscillator, in which case the inferior antenna acts as a "director". I have found that the optimum separation between the reflector and the principal radiating antenna is of the order of ¼ wavelength (λ/4), and that the optimum phase difference under these conditions is π/2. Under these conditions the zenith ray may be almost completely eliminated, and maximum directivity toward the earth is obtained.

My invention is not limited to the specific arrangements described herein, which are given merely by way of illustration, but extends to many variations and modifications thereof.

I claim:

1. The method of determining the altitude of an aircraft by radiating electrical waves from an antenna on said aircraft to cause reflection of said waves from the earth's surface, receiving said waves reflected from the earth's surface at said antenna, and utilizing a characteristic of said received waves to determine the altitude of said aircraft above the earth's surface including the steps of, lumping the inductance of said antenna between adjacent half wave length portions thereof, impressing oscillations on the lumped inductance of said antenna, and maintaining the electrical center of said antenna at the potential of the conducting structure of said aircraft.

2. The method of determining the altitude of an aircraft by radiating electric waves from an antenna on said aircraft to cause reflection of said waves from the earth's surface, receiving waves reflected from the earth at said antenna, and utilizing a characteristic of said received waves to determine the altitude of said aircraft above the earth's surface which includes the steps of lumping the inductance of said antenna between alternate half wave length portions thereof, impressing oscillations on said lumped inductance symmetrically, and maintaining the electrical center of said aerial at the potential of the conducting surface of said aircraft.

3. The method of determining the altitude of an aircraft by radiating electric waves from an antenna on said aircraft to cause reflection of said waves from the earth's surface, receiving waves reflected from the earth at said antenna, and utilizing a characteristic of said received waves to determine the altitude of said aircraft above the earth's surface including the steps of, lumping a portion of the inductance of said antenna intermediate two half wave length portions thereof, impressing on said lumped inductance oscillations of a frequency substantially greater than the normal frequency of said antenna, and maintaining the electrical center of said antenna at the potential of the conducting surfaces of said aircraft.

4. In a device for determining the altitude of an aircraft by radiating electric waves from an antenna on said aircraft to cause reflection of said waves from the earth's surface, receiving waves reflected from the earth at said antenna, and utilizing a characteristic of said received waves to determine the altitude of said aircraft above the earth's surface, an antenna comprising a series of radiating ½ wave elements in alternation with non-radiating elements in which the currents are of opposite sign, and means for maintaining said antenna electrically symmetrical with respect to the conducting fabric of said aircraft.

5. The method of determining the altitude of an aircraft by radiating electrical waves from an antenna at said aircraft to cause a reflection of said waves from the earth's surface, receiving waves reflected from the earth on said antenna, and utilizing a characteristic of said received waves to determine the altitude of said aircraft above the earth's surface including the steps of, lumping the inductance of a half wave length portion of said antenna intermediate adjacent half wave length portions to suppress radiation from the lumped portion, symmetrically impressing on said antenna oscillations of a frequency greater than the normal frequency of said antenna, and maintaining the electrical center of said oscillator and said antenna at the potential of the conducting surfaces of said aircraft.

6. An altimeter for use on an aircraft having a conductive frame comprising, a thermionic generator having an oscillation circuit which is symmetrically balanced with respect to the conductive frame of said aircraft, a symmetrical aerial system, a symmetrical coupling between said generator and said aerial system, and a connection between the electrical center of said aerial system and the conducting frame of said aircraft.

7. An arrangement as claimed in claim 6 in which the electrical center of said generator circuit is connected to the conducting frame of said aircraft.

8. The method of determining the altitude of an aircraft by radiating electrical waves from an antenna on said aircraft to cause reflection of said waves from the earth's surface, receiving said waves reflected from the earth's surface at said antenna, and utilizing a characteristic of said received waves to determine the altitude of said aircraft above the earth's surface including the steps of, lumping the inductance of said antenna between adjacent half wave length portions thereof, impressing oscillations upon the lumped inductance of said antenna, and maintaining said antenna electrically symmetrical with respect to the conducting structure of said aircraft.

9. The method of determining the altitude of an aircraft by radiating electrical waves from an antenna on said aircraft to cause reflection of said waves from the earth's surface, receiving waves reflected from the earth at said antenna, and utilizing a characteristic of said received waves to determine the altitude of said aircraft above the earth's surface including the steps of, lumping portions of the inductance of said antenna intermediate half wave length portions thereof, impressing on one of said lumped inductances oscillations of a frequency substantially greater than the normal frequency of said antenna, and maintaining said antenna electrically symmetrical with respect to the conducting surfaces of said aircraft.

10. An altimeter for use on aircraft having a conductive frame comprising, an antenna system including a series of radiating portions which are one half wave length long, separated by a non-radiating portion which includes a lumped inductance, a source of oscillations on said aircraft symmetrically grounded to the conductive frame of said aircraft, a symmetrical coupling between said source of oscillations and said lumped inductance, whereby radiation is obtained from said antenna system when said lumped inductance is energized by said source of oscillations, and means for increasing the directivity of said antenna system comprising a reflecting element arranged on said aircraft adjacent said antenna system, said reflecting element being symmetrically arranged with respect to the conductive frame of said aircraft and with respect to said antenna system.

11. A device as recited in claim 10 in which said reflecting element includes linear portions separated by a phase-adjusting impedance.

12. The method of determining the position of an aircraft relative to a reflecting object by radiating electrical waves from an antenna on said aircraft to cause reflection of said waves from said object, receiving said waves reflected from said object at said antenna, and utilizing a characteristic of said received waves to determine the position of said aircraft relative to said object above including the steps of, lumping the reactance of said antenna between adjacent half wave length portions thereof, impressing oscillations upon the lumped reactance of said antenna, and maintaining said antenna, including said lumped reactance, electrically symmetrical with respect to the conductive structure of said aircraft.

STUART BALLANTINE.